(12) United States Patent
Humer et al.

(10) Patent No.: US 7,857,381 B2
(45) Date of Patent: Dec. 28, 2010

(54) ACTIVE HEAD RESTRAINT SYSTEM WITH LUMBAR SUPPORT FOR VEHICLE SEATS

(75) Inventors: Mladen Humer, West Bloomfield, MI (US); Arjun V. Yetukuri, Rochester Hills, MI (US); Eric Veine, Wixom, MI (US)

(73) Assignee: Lear Corporation, Southfield, MI (US)

( * ) Notice: Subject to any disclaimer, the term of this patent is extended or adjusted under 35 U.S.C. 154(b) by 123 days.

(21) Appl. No.: 12/210,597

(22) Filed: Sep. 15, 2008

(65) Prior Publication Data

US 2010/0066135 A1 Mar. 18, 2010

(51) Int. Cl.
*B60N 2/42* (2006.01)

(52) U.S. Cl. .................................. 297/216.12
(58) Field of Classification Search ............ 297/216.12, 297/216.13, 216.14, 410, 284.4, 408, 216.1
See application file for complete search history.

(56) References Cited

U.S. PATENT DOCUMENTS

| | | | |
|---|---|---|---|
| 5,823,620 A | 10/1998 | Le Caz | |
| 6,019,424 A | 2/2000 | Ruckert et al. | |
| 6,523,892 B1 | 2/2003 | Kage et al. | |
| 6,789,845 B2 | 9/2004 | Farquhar et al. | |
| 6,789,846 B2 * | 9/2004 | Humer et al. | 297/216.12 |
| 6,837,541 B2 | 1/2005 | Farquhar et al. | |
| 6,955,397 B1 | 10/2005 | Humer | |
| 7,234,769 B2 | 6/2007 | Takenaka et al. | |
| 7,252,335 B2 | 8/2007 | Samain et al. | |
| 7,284,794 B2 | 10/2007 | Yamaguchi et al. | |
| 2006/0071517 A1 | 4/2006 | Humer et al. | |
| 2006/0103189 A1 | 5/2006 | Humer et al. | |
| 2006/0103190 A1 | 5/2006 | Humer et al. | |
| 2006/0202524 A1 | 9/2006 | Yamaguchi | |
| 2007/0085390 A1 | 4/2007 | Kawashima et al. | |
| 2008/0007106 A1 | 1/2008 | McMillen et al. | |
| 2008/0084098 A1 | 4/2008 | Humer et al. | |
| 2008/0265637 A1 * | 10/2008 | Niitsuma et al. | 297/216.12 |

FOREIGN PATENT DOCUMENTS

| | | |
|---|---|---|
| JP | 2007106356 A | 4/2007 |
| WO | 2007026790 A1 | 3/2007 |

* cited by examiner

*Primary Examiner*—Milton Nelson, Jr.
(74) *Attorney, Agent, or Firm*—Brooks Kushman P.C.

(57) ABSTRACT

A vehicle seat is disclosed with a seat back frame with a pair of spaced apart linkages connected to side members of the frame. A horizontally actuatable lumbar mechanism is connected to the pair of linkages for providing lumbar support to the occupant and for receiving an input force for actuating the linkages. A head restraint extends from the seat back frame and is operably connected to the frame and the pair of linkages such that actuation of the linkages actuates the head restraint from a design position to an actuated position. A flexible band lumbar support mechanism is provided. Also, a lumbar mechanism is provided with a pair of upright wires and a series of transverse suspension wires for supplying the back of the occupant and for distributing the input force during an impact.

20 Claims, 4 Drawing Sheets

ACTIVE HEAD RESTRAINT SYSTEM WITH LUMBAR SUPPORT FOR VEHICLE SEATS

BACKGROUND OF THE INVENTION

1. Technical Field

Embodiments of the invention relate to active head restraint systems with lumbar supports for vehicle seats.

2. Background Art

Vehicle seats are provided with active head restraint systems with adjustable lumbar supports. One example of a vehicle seat having an active head restraint system with an adjustable lumbar support is disclosed in U.S. Patent Application Publication No. 2008/0084098 A1, which published on Apr. 10, 2008.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
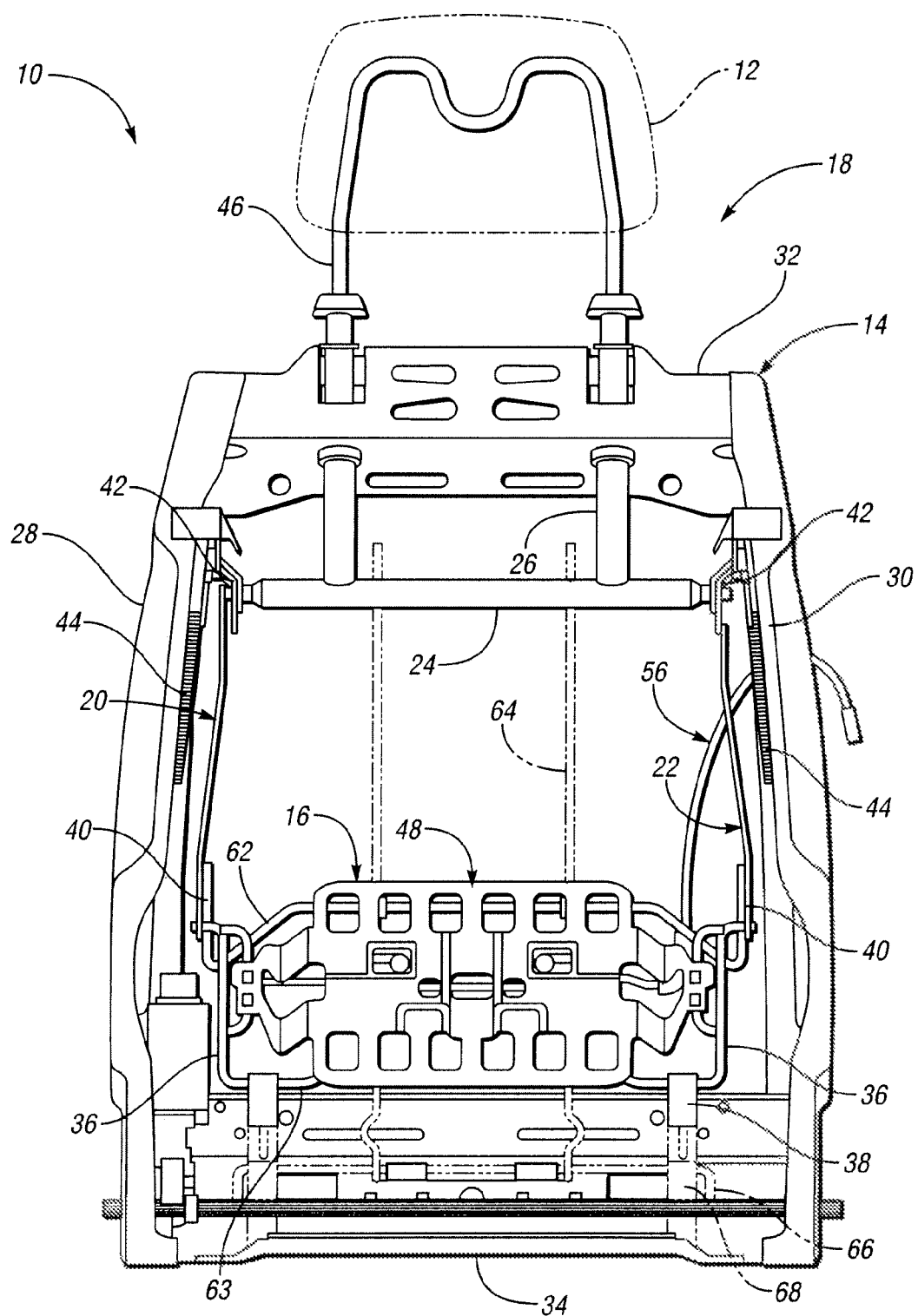
FIG. 1 is a front side elevation view of a seat back of a vehicle seat according to embodiments of the present invention.

With reference now to FIG. 1, a seat back for a vehicle seat is illustrated according to an embodiment of the present invention and is referenced generally by numeral 10. The vehicle seat includes a seat cushion (not shown) that is adapted to be installed within an interior of a vehicle, such as an automobile, aircraft, water craft, or the like, for seating an occupant. The seat back 10 is also installed in the vehicle for supporting the back of an occupant. The seat back 10 may be mounted directly to the vehicle or connected to the seat cushion. Although an individual seat is depicted in FIG. 1, the invention contemplates any seat configuration, such as a bench seat, a split frame seat, a front row seat, a rear row seat, or the like.

The seat cushion and the seat back 10 are both fabricated from suitable and known materials and manufacturing methods. For example, the seat cushion may utilize a structural frame, foam for cushioning, and a covering.

In the description, various embodiments, operating parameters, and components of the embodiments that are described with directional language, such as "upper," "lower," "upright," and words of similar import, designate direction shown in the drawings or are understood in the field of the art. Such directional terminology is used for relative description and clarity and is not intended to limit the orientation of any embodiment or component of any embodiment to a particular direction or orientation.

The seat back 10 extends from the seat cushion. The seat also includes a head restraint 12 extending above the seat back 10 for supporting the head of the occupant against the head restraint 12. The seat back 10 is illustrated with a cover and padding removed for depicting internal components. The seat back 10 includes a frame 14 for providing structural support for the seat back 10. The seat back 10 may include a horizontally actuatable lumbar support mechanism 16 for providing lumbar support to the occupant, while providing adjustability so that the occupant can select a desired level of comfort and support. The lumbar mechanism 16 is an input for an active head restraint system 18, the interconnections of which will be discussed with detail below. For example, the lumbar mechanism 16 is connected to an actuatable mechanism, such as linkages 20, 22. Upon receipt of an impact to the lumbar mechanism 16, such as a body of the occupant that exceeds a predetermined force, the lumbar mechanism 16 actuates the linkages 20, 22, which distribute the actuation through the active head restraint system 18. The output of the linkages 20, 22 is the head restraint 12, so that the head restraint 12 is translated forward and upward relative to the seat back 10, as is known in the art for active head restraint systems.

According to at least one embodiment, the output of the linkages 20, 22 includes an armature 24 that extends transversely across the frame 14. The armature 24 is connected to the linkages 20, 22 for translation and/or rotation relative to the frame 14. The head restraint 12 is supported by the armature 24 by a pair of upright tubes 26.

In at least one embodiment, the seat back frame 14 includes a pair of spaced apart side members 28, 30 that are each mounted to lateral ends of an upper cross member 32 and a lower cross member 34. The linkages 20, 22 and the frame 14 may collectively provide a four-bar mechanism, such as a four-bar link mechanism that is illustrated, and is discussed in greater detail below.

The linkages 20, 22 each include a lower link 36, which is pivotally connected to the frame 14 by a pair of bearings 38 that are formed upon the lower cross member 34. The lower links 36 may be formed integrally to extend across both lateral sides of the seat back 10 within the frame 14. A pair of coupler links 40 are each pivotally connected to one of the lower links 36. A pair of upper links 42 are each pivotally connected to the coupler links 40 and to the corresponding side members 28, 30. A pair of extension springs 44 are connected to an intermediate region of the corresponding side member 28, 30 and to one of the corresponding upper links 42. The extension springs 44 urge the linkages 20, 22 to a design position as illustrated. In one embodiment, the four-bar mechanism is defined by the lower links 36, the coupler links 40, the upper links 42 and the side members 28, 30.

According to at least one embodiment, the armature 24 extends laterally across the frame 14 and is pivotally connected to both of the upper links 42 for pivoting about an axis that is offset linearly between the pivotal connection of the upper links 42 and the coupler links 40, and the pivotal connection provided by the upper links 42 and the frame 14. The armature 24 interconnects the linkages 20, 22 of both lateral sides for uniform actuation.

The pair of upright tubes 26 extend from the armature 24 through the upper cross member 32. The upright tubes 26 receive a pair of rods 46 to support the head restraint 12 above the seat back 10. The upright tubes 26 cooperate with the upper cross member 32 for linear translation relative to the upper cross member 32, and for rotation about the armature 24 relative to the upper cross member 32.

During an impact condition, the seat back 10 may receive a force of the occupant against the seat back 10. The active head restraint system 18 actuates the head restraint 12 from the design position to an actuated position to orient the head restraint 12 higher relative to the seat back 10, and closer to the head of the occupant in order to reduce injury to the occupant. The input force may be generated, for example, when the vehicle impacts another object thereby accelerating the seat into the occupant. Such an impact condition may be generated from impact, such as a rear impact. Likewise, the impact condition may be generated from a forward impact wherein the occupant rebounds from a seat harness or other mechanism, into the seat. If the force of the occupant exceeds a predetermined force to overcome the bias of the extension springs 44, then the active head restraint system 18 actuates. U.S. Patent Application Publication 2008/0084098 A1, which published on Apr. 10, 2008 to Humer et al. discloses a suitable active head restraint system with further details regarding the linkage, and therefore is incorporated by reference herein.

Figure 2:
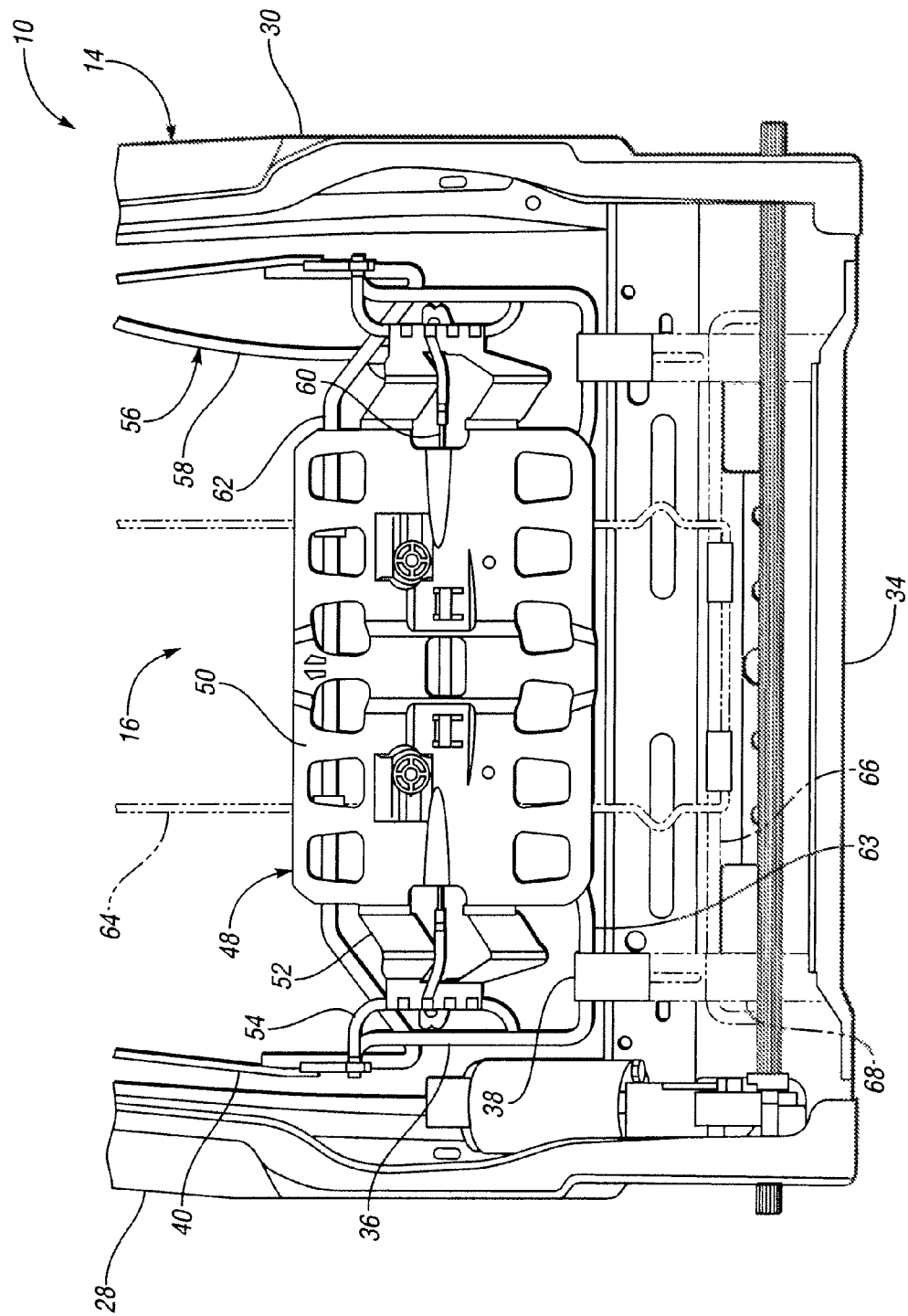
FIG. 2 is an enlarged front side elevation view of a lower region of the seat back of FIG. 1.

Prior art head restraint systems often utilize vertically actuatable lumbar support mechanisms. The horizontal lumbar support mechanism 16 demonstrates a suitable horizontally actuatable lumbar mechanism 16 that can be utilized in combination with an active head restraint system 18. Referring now to FIG. 2, the lumbar support mechanism 16 includes a flexible band 48 that provides a lumbar support plate 50. A pair of collapsible extensions 52 each extend from a lateral side of the plate 50 and attach to the corresponding lower link 36. A pair of attachment wires 54 can each be provided upon the lower links 36 for attachment of the collapsible extension 52 to the lower link 36. For example, the attachment wires 54 may be welded to the lower links 36. The collapsible extensions 52 may each be mounted to one of the attachment wires 54 with an interference fit for assembling the band 48 to the linkages 20, 22. Alternatively, the collapsible extensions 52 may each be mounted directly to the corresponding lower link 36.

The band 48 may be formed from a flexible material, such as an injection molded polymer to be flexed to various fore and aft positions relative to the seat back 10 for user adjusted horizontal lumbar support. Accordingly, a cable assembly 56 may be provided for extension and retraction of the band 48. The cable assembly 56 may be a Bowden cable with a sheath 58 mounted to one of the attachment wires 54, and an internal cable 60 that extends from the sheath 58 to the other attachment wire 54. The cable assembly 56 extends to an actuator, which may be motor-driven or manually-operated for controlling the tension of the cable 60. The adjustment of the cable 60, which is retained to a back surface of the support plate 50 of the band 48, can be flexed in the fore and aft positions thereby adjusting the position of the band for user select of lumbar support.

The linkages 20, 22 are often designed for withstanding axial loads. Since the horizontal lumbar support mechanism 16 applies a transverse load to the linkages 20, 22 due to the tension of the cable assembly 56, a reinforcement bar 62 is provided interconnecting the coupler links 40 of the linkages 20, 22. By utilization of the reinforcement bar 62 for withstanding transverse loading, the thicknesses of the links 36, 40, 42 can be designed to withstand axial loading. The coupler links 40 and the reinforcement bar 62 can be formed integrally from a single structural wire or piece. The reinforcement bar 62 additionally resists transverse loading associated with a force applied to the lumbar mechanism 16 during an impact condition. Alternatively, the reinforcement bar 62 could be replaced with an inverted lower link 36. An intermediate crossbar 63 of the lower link 36 could extend across the coupler links 40, instead of providing the pivotal connection with the bearings 38. Accordingly, the distal ends that are depicted connected to the coupler links 40 could be connected to the bearings 38 in the inverted embodiment.

The lumbar support mechanism 16 may distribute the load from an impact condition directly to the lower links 36 for actuating the linkages 20, 22 and consequently the head restraint 12. Alternatively, the lumbar support mechanism 16 may distribute the load from an impact condition throughout the linkages 20, 22. Referring now to FIGS. 1 and 2, a pair of upright wires 64 are illustrated in phantom and are connected to a lower cross wire 66. The lower cross wire 66 extends transversely across the seat back frame 14 and is mounted in a pair of ramps 68. The ramps 68 are mounted on the lower cross member 34 of the frame 14, and may provide the bearings 38 for the lower links 36. The upright wires 64 extend from the lower cross wire 66, behind the support plate 50 of the lumbar support mechanism 16, and are connected to the armature 24 at their upper ends. During an impact condition, the lumbar support mechanism 16 distributes the load to the lower links 36 and to the upright wires 64. The upright wires 64 extend upward and rearward due to cooperation with the ramps 68 and distribute some of the loading directly to the armature 24 for actuating the head restraint 12. Alternatively, the upright wires 64 may also engage the reinforcement bar 62 for distributing some of the loading directly to the coupler links 40. The distribution of the impact across linkages 20, 22 assists in accelerating the actuation of the head restraint 12 to the design position.

Figure 3:
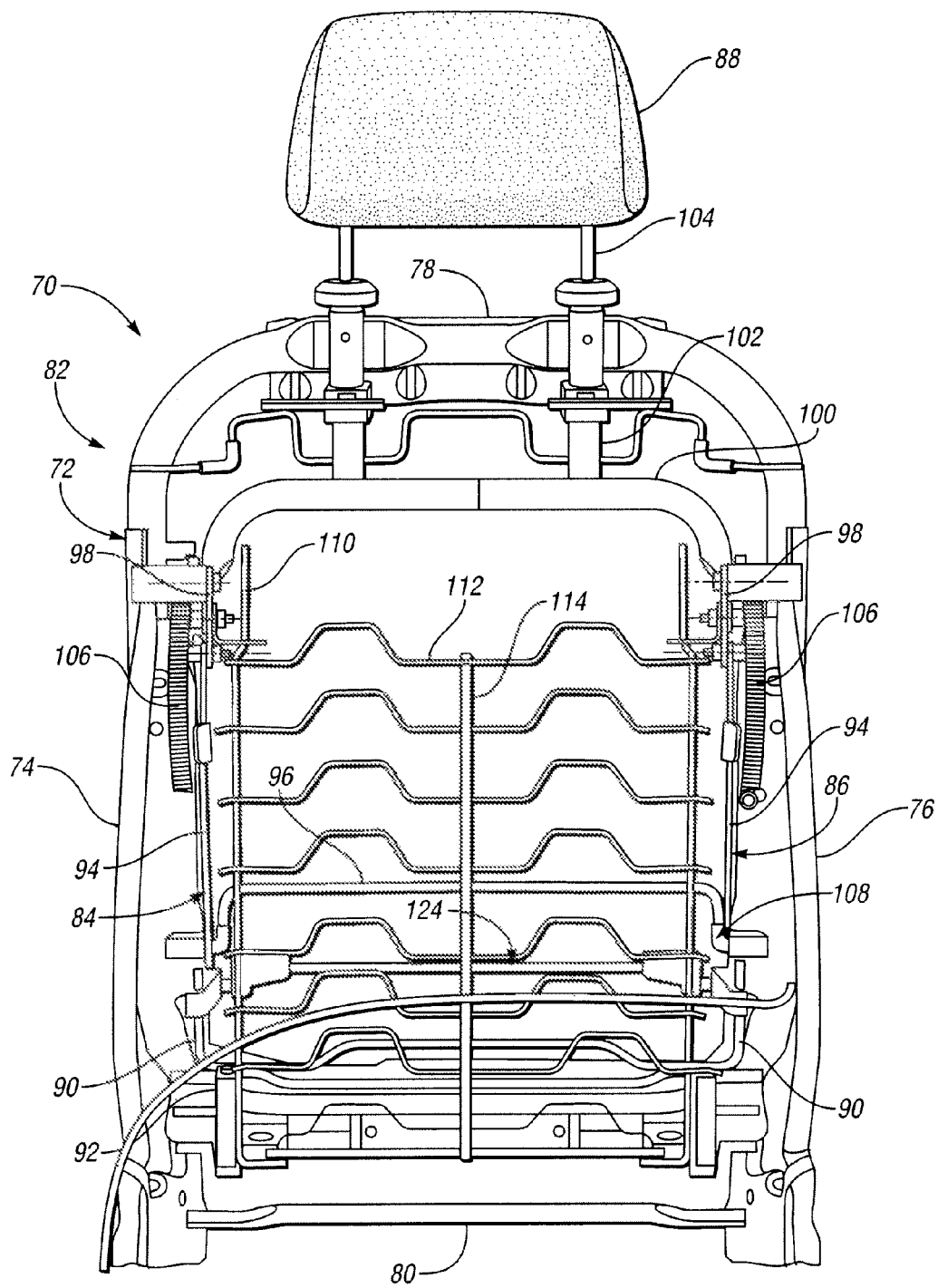
FIG. 3 is a front side perspective view of a seat back according to another embodiment of the present invention.

Referring now to FIG. 3, a seat back 70 is illustrated according to another embodiment. The seat back 70 includes a frame 72 having a pair of side members 74, 76 interconnected by an upper cross member 78 and a lower cross member 80. The seat back 70 includes an active head restraint system 82 with a pair of linkages 84, 86 for actuating a head restraint 88.

Similar to the prior embodiment, a lower link 90 is pivotally connected to a pair of bearings 92 supported on the lower cross member 80. A pair of coupler links 94 are pivotally connected to the lower links 90. A reinforcement bar 96 interconnects the coupler links 94 for resisting transverse loads to the linkages 84, 86. A pair of upper links 98 are each pivotally connected to one of the coupler links 94 and one of the side members 74, 76. An armature 100 is pivotally connected to each of the upper links 98. A pair of upright tubes 102 extend through the upper cross member 78 and receive rods 104 that support the head restraint 88. A pair of extension springs 106 are each connected to one of the upper links 98 and one of the side members 74, 76 for biasing the linkages 84, 86 to a design position.

A lumbar support mechanism 108 is mounted to each of the linkages 84, 86 for distributing a load during an impact condition to the linkages 84, 86 to rotate and translate the armature 100 such that the head restraint 88 extends upward and forward during an impact condition. The lumbar support mechanism 108 includes a pair of spaced apart upright wires 110 with a series of transverse suspension wires 112 extending between the upright wires 110. Additionally, a central upright wire 114 is connected to a central portion of each of the suspension wires 112 for additional support.

Figure 4:
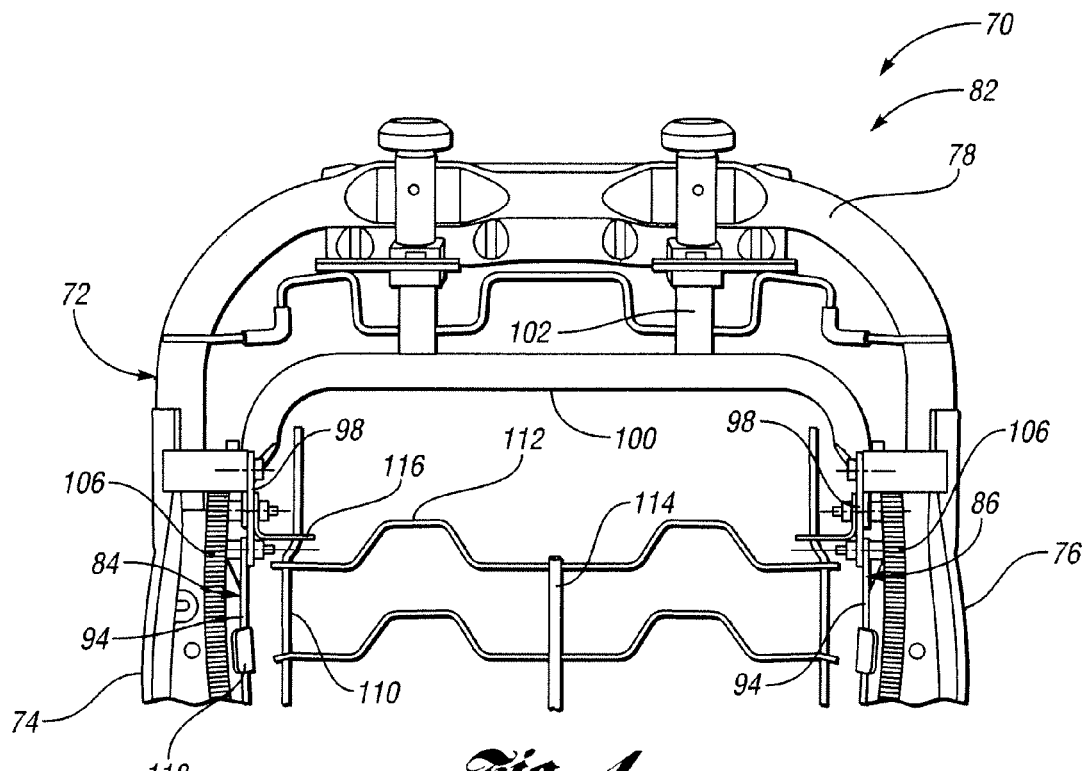
FIG. 4 is an enlarged perspective view of an upper region of the seat back of FIG. 3.

Referring to FIG. 4, an upper end of each of the upright wires 110 is connected directly to a bracket 116 extending from the armature 100. Additionally, an intermediate region of the upright wires 110 is connected to a bracket 118 on an intermediate region of the coupler links 94. This connection may be provided by a distal portion of the corresponding suspension wire 112 extending from the upright wire 110 and connecting to the bracket 118.

Figure 5:
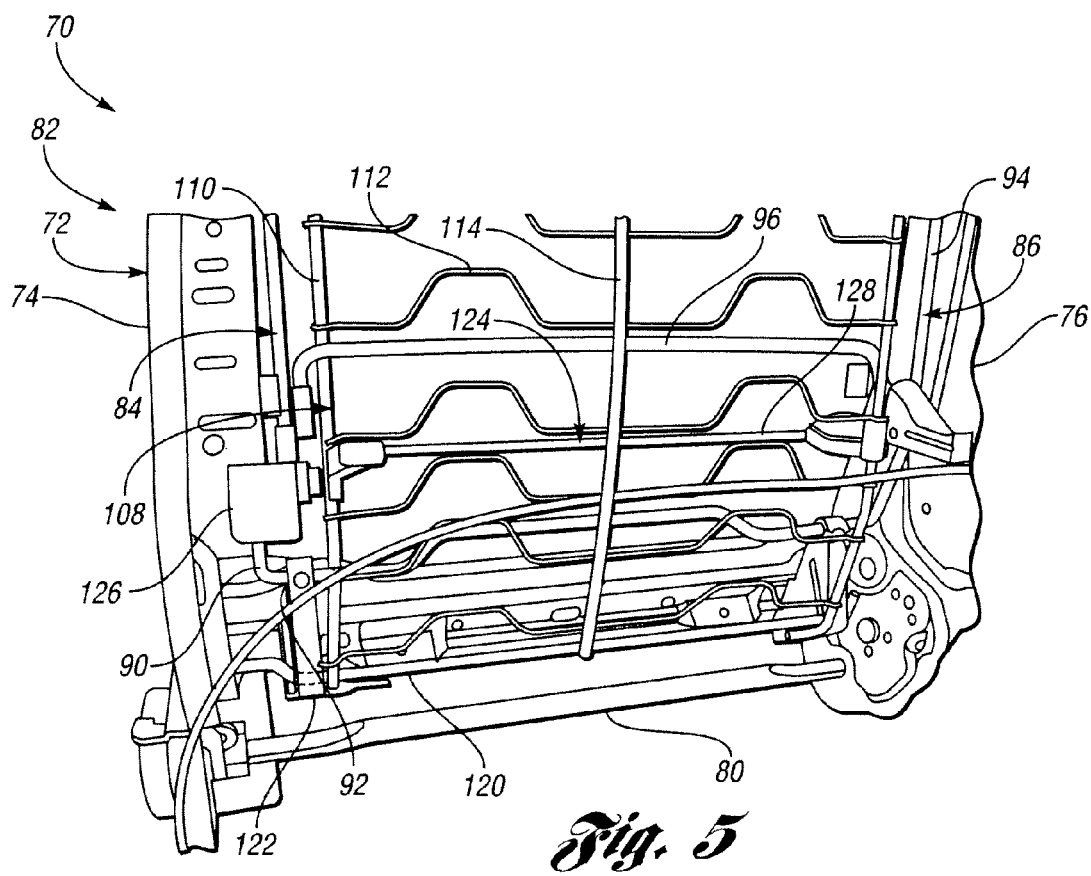
FIG. 5 is an enlarged perspective view of a lower region of the seat back of FIG. 3.

Referring now to FIG. 5, a lower end of the upright wires 110 is connected to a cross wire 120. The cross wire 120 extends laterally across the frame 72 and is received in a pair of ramps 122 that are mounted to the lower cross member 80.

The lumbar support mechanism 108 includes a cable assembly 124 that is mounted to a bracket 126 on a lower end of each of the coupler links 94. The cable assembly 124 is a Bowden cable assembly 124 with a sheath 128 connected to each of the upright wires 110. The cable assembly 124 extends to a power-operated or manually-operated actuator in the seat back 70 for adjusting the tension of a cable within the sheath 128 for urging the upright wires 110 in a lumbar region transversely toward or away from another thereby causing the suspension wires 112 to buckle, such that the suspension wires 112 to extend or retract in a fore or aft direction, thereby providing the adjustable lumbar support.

The lumbar support mechanism 108 receives an impact force from an occupant during an impact condition and distributes the load to the linkages 84, 86. The lumbar support mechanism 108 provides a large surface area contact, which is quickly actuated during an impact condition. For example, a pelvis force input starts at the ramps 122 through the upright wires 110 and consequently into the armature 100. A lumbar force input is distributed through the cable assembly 124 into the couple links 94. A shoulder force input is distributed through the suspension wires 112 to the bracket 118 on the coupler links 94.

According to another embodiment, the lumbar support mechanism 108 is provided without the cable assembly 124. Therefore, the lumbar support mechanism 108 is not adjustable but provides lumbar support to the occupant and distributes the input force to the linkages 84, 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a seat back frame for supporting a back of an occupant having a pair of spaced apart side members and at least one cross member connected to the pair of side members;
   a pair of spaced apart linkages each operably connected to one of the side members;
   a horizontally actuatable lumbar mechanism connected to each of the pair of linkages for providing lumbar support to the occupant and for receiving an input force for actuating the pair of spaced apart linkages; and
   a head restraint extending from the seat back frame for supporting a head of the occupant, the head restraint being operably connected to the frame and the pair of linkages such that actuation of the pair of linkages actuates the head restraint from a design position to an actuated position;
   wherein each of the pair of linkages further comprises:
      a first link pivotally connected to the seat back frame,
      a second link pivotally connected to the first link, and
      a third link pivotally connected to the second link and the seat back frame.

2. The vehicle seat of claim 1 wherein the lumbar mechanism further comprises:
   a flexible member mounted to each of the pair of linkages; and
   a cable assembly mounted to each of the pair of linkages in cooperation with the flexible member for extension and retraction of the flexible member relative to the seat back frame for providing adjustment of the lumbar mechanism.

3. The vehicle seat of claim 2 wherein the flexible member further comprises a band having a lumbar support surface oriented between a pair of collapsible regions.

4. The vehicle seat of claim 2 wherein the flexible member further comprises:
   a pair of spaced apart upright wires each connected to one of the pair of linkages; and
   a plurality of transverse suspension wires, each extending between and connected to the pair of upright wires.

5. The vehicle seat of claim 1 wherein each linkage and the frame collectively provide a four-bar mechanism.

6. The vehicle seat of claim 1 wherein the lumbar mechanism is oriented between the pair of linkages.

7. A vehicle seat comprising:
   a seat back frame for supporting a back of an occupant having a pair of spaced apart side members and at least one cross member connected to the pair of side members;
   a pair of spaced apart lower links each pivotally connected to the seat back frame;
   a pair of spaced apart coupler links each pivotally connected to one of the lower links;
   a pair of spaced apart upper links each pivotally connected to one of the coupler links and the seat back frame;
   a horizontally actuatable lumbar mechanism connected to at least one of the pairs of links and oriented between the pairs of links for providing lumbar support to the occupant and for receiving an input force for actuating the pairs of links; and
   a head restraint extending from the seat back frame for supporting a head of the occupant, the head restraint being operably connected to the frame and the pair of upper links such that actuation of the pairs of links actuates the head restraint from a design position to an actuated position.

8. The vehicle seat of claim 7 further comprising a reinforcement bar connected to the pair of coupler links to resist transverse forces applied by the lumbar mechanism.

9. The vehicle seat of claim 7 wherein the lumbar mechanism further comprises:
   a flexible member mounted to one of the pair of links; and
   a cable assembly mounted to the one of the pair of links in cooperation with the flexible member for extension and retraction of the flexible member relative to the seat back frame for providing adjustment of the lumbar mechanism.

10. The vehicle seat of claim 9 wherein the flexible member further comprises a band having a lumbar support surface oriented between a pair of collapsible regions that are each connected to one of the pair of lower links.

11. The vehicle seat of claim 10 further comprising a pair of attachment wires each welded to one of the pair of lower links wherein the pair of collapsible regions of the band are each mounted with an interference fit to one of the pair of attachment wires.

12. The vehicle seat of claim 10 further comprising:
   an armature extending between and pivotally connected to each of the pair of upper links;

at least one upright tube extending from the armature for supporting the head restraint, the at least one tube cooperating with the at least one cross member of the seat back frame to pivot and slide relative to the seat back frame as the pairs of links are actuated; and an upright support having a lower end mounted to the seat back frame to pivot and slide relative to the seat back frame, an intermediate region extending along a rear side of the band, and an upper end mounted to the armature for distributing an input force from the band to the armature.

13. The vehicle seat of claim 9 wherein the flexible member further comprises:

a pair of spaced apart upright wires each connected to one of the pairs of links; and a plurality of transverse suspension wires, each extending between and connected to the pair of upright wires.

14. The vehicle seat of claim 13 further comprising a lower cross wire connected to the pair of upright wires and mounted to the seat back frame to pivot and slide relative to the seat back frame.

15. The vehicle seat of claim 13 further comprising:

an armature extending between and pivotally connected to each of the pair of upper links; and at least one upright tube extending from the armature for supporting the head restraint, the at least one tube cooperating with the at least one cross member of the seat back frame to pivot and slide relative to the seat back frame as the pairs of links are actuated;

wherein the pair of upright wires are each connected to the armature for distributing an input force from the transverse suspension wires to the armature.

16. The vehicle seat of claim 13 wherein the pair of upright wires are each connected to one of the pair of coupler links for distributing an input force from the transverse suspension wires to the pair of coupler links.

17. The vehicle seat of claim 13 wherein the cable assembly is connected to the pair of coupler links.

18. The vehicle seat of claim 7 further comprising a biasing member cooperating with one of the pair of links for maintaining the head restraint in the design position in absence of an impact condition.

19. The vehicle seat of claim 7 further comprising:

an armature extending between and pivotally connected to each of the pair of upper links; and at least one upright tube extending from the armature for supporting the head restraint, the at least one tube cooperating with the at least one cross member of the seat back frame to pivot and slide relative to the seat back frame as the pairs of links are actuated.

20. A vehicle seat comprising:

a seat back frame for supporting a back of an occupant having a pair of spaced apart side members and at least one cross member connected to the pair of side members;

an armature extending between and pivotally connected to each of the pair of side members;

a lower cross wire mounted to the seat back frame to pivot and slide relative to the seat back frame;

a pair of upright wires are each extending from the lower cross wire and connected to the armature;

a horizontally actuatable lumbar mechanism connected to the pair of upright wires for providing lumbar support to the occupant and for receiving an input force for actuating the pair of upright wires, and consequently, the lower cross wire and the armature; and a head restraint extending from the seat back frame for supporting a head of the occupant, the head restraint being operably connected to the armature such that actuation of the armature actuates the head restraint from a design position to an actuated position.

* * * * *